Patented Feb. 18, 1930

1,747,785

UNITED STATES PATENT OFFICE

CHESTER A. MITCHEL, OF CHICAGO, ILLINOIS, ASSIGNOR TO THE H. E. FREES CO., A CORPORATION OF ILLINOIS

MANUFACTURE OF MALT LIQUIDS

No Drawing.   Application filed February 13, 1928.   Serial No. 254,164.

The present invention relates to the improvements in malt liquids, and more particularly to the securing of desirable hop taste and flavors in malt extracts, syrups and the like. In order that it may be fully understood, it is described hereinafter in connection with the manufacture of a concentrated malt syrup, although it will be readily appreciated that the scope of the invention is not limited to the manufacture of this type of product.

The grain to be mashed, which may consist entirely of barley malt or may be a mixture of malt with other grains, such as corn, is mashed with a suitable proportion of water; for example 10 barrels of water to each 1000 lbs. of grain. The mashing operation is conducted at temperatures and for times suitable for securing the desired peptonizing and diastatic enzyme actions in the grain; for example, mashing operation may be begun at about 37.4 to 40° C.; the temperature may then be raised to about 70° C. for a short period and then increased to 75 to 76.25° C., at which it is held for an hour or longer to secure the desired diastatic enzyme action. It is readily understood, of course, that the procedure during mashing, and particularly with respect to the extent of proteolytic and diastatic conversion, may be modified within wide ranges, as well understood in the art, in order to secure the desired relations between soluble proteins, sugars, carbohydrates and total solids.

The hop substances are prepared by an initial steam distillation of the hops, the essential oils and other volatile constituents of the hops thus removed being separately collected. This steam distillation may be suitably affected, for example, by introducing the hops into a suitable still, adding water thereto in any desired proportion, for example, 30 to 35 gallons of hot water to 40 lbs. of hops, and boiling the mixture by means of live steam. The vapors given off are condensed and collected, the oils and other volatile constituents floating on the surface of the aqueous distillate and the latter being returned to the still. The steam distillation is continued until practically all of the volatile oils have been distilled from the hops, this requiring about two hours. If desired, the distillation may be effected in vacuo.

The wort of the desired character having been produced, the residual hop substances are added to it in the kettle and the mixture boiled for a suitable period of time, say one hour. The wort is then run through the hop jack and is subjected to the necessary heat treatment for producing the desired product. Thus, in the case of the production of a malt syrup, it is run to vacuum pans or other suitable evaporating devices and reduced to the desired concentration; for example, 80% solids. The concentrated extract or syrup is then run to suitable agitators in which it is cooled, the volatile oils and other volatile constituents driven off from the hops as before described being added to the extract or syrup after its temperature has dropped to about 71° C. or lower.

It is readily apparent that the proportions of hop constituents incorporated in the product may be varied in accordance with the degree and character of hop flavor desired. For example, a suitable proportion has been found to be the constituents of 40 lbs. of hops in a proportional amount of the products equivalent to 1000 lbs. of the grain originally mashed.

The volatile oils and constituents from the hops are thoroughly intermixed with the extract or syrup until a homogeneous product is obtained. This product is found to have to a high degree the desirable hop flavor and taste characteristics. It is readily apparent that the invention may be applied to other malt products, such as to the preparation of worts for the manufacture of high extract malt tonics and other products.

I claim:

1. The method of preparing a malted liquid, which comprises distilling off the volatile constituents of hops at a pressure thereof less than atmospheric, collecting the said volatile constituents, admixing the nonvolatile hop materials with a malt wort and subjecting the mixture to an elevated temperature, separating the resulting malt wort containing hop extractives from the residual hop material, heating the malt wort containing hop extractives and subsequently cooling it and incorporating into it the volatile constituents derived from the hops.

2. The method of producing a malt product which comprises subjecting hops to steam distillation to remove the volatile constituents therefrom, collecting said volatile constituents, incorporating the non-volatile hop material into a malt wort, boiling the mixture to effect extraction of hop materials by the wort, separating the malt wort containing hop extractives from the residual hop material, cooling and incorporating into it the collected volatile constituents of the hops.

3. The method of producing a malt product which comprises subjecting hops to steam distillation to remove the volatile constituents therefrom, collecting said volatile constituents, incorporating the non-volatile hop material into a malt wort, boiling the mixture to effect extraction of hop materials by the wort, separating the malt wort containing hop extractives from the residual hop material, heating it to remove water and effect concentration, cooling the resulting concentrate and adding to it the collected volatile constituents of the hops.

CHESTER A. MITCHEL.